United States Patent [19]

Taylor

[11] Patent Number: 4,816,095
[45] Date of Patent: Mar. 28, 1989

[54] PROCESS FOR RETREADING OR RECAPPING TIRES

[76] Inventor: Patrick A. Taylor, 1216 - 35th St., Rock Island, Ill. 61201

[21] Appl. No.: 725,761

[22] Filed: Apr. 22, 1985

[51] Int. Cl.⁴ ............................................. B29D 30/54
[52] U.S. Cl. ...................................... 156/96; 156/289; 264/36
[58] Field of Search ................. 156/96, 286, 289, 395, 156/245, 909; 264/36, 130; 428/474.4, 475.5, 200; 525/184

[56] References Cited

U.S. PATENT DOCUMENTS

| | | | |
|---|---|---|---|
| 3,779,833 | 12/1973 | Reppel | 264/36 X |
| 3,886,028 | 5/1975 | Hindin et al. | 156/96 X |
| 4,075,047 | 2/1978 | Brodie et al. | 156/96 |
| 4,105,482 | 8/1978 | Wapelhorst et al. | 156/96 |
| 4,181,550 | 1/1980 | Paine | 428/474.4 X |
| 4,309,234 | 1/1982 | Witherspoon | 156/96 |
| 4,444,829 | 4/1984 | Bollen et al. | 525/184 X |
| 4,500,375 | 2/1985 | Goldstein | 156/395 X |

Primary Examiner—Michael W. Ball
Assistant Examiner—Ramon R. Hoch

[57] ABSTRACT

A process for recapping tires includes the steps of placing a tread strip around the circumference of a used tire casing with a bonding media interposed between the strip and casing; covering the treadstrip with a high termperature nylon film having a plurality of perforations substantially uniformly distributed across the surface of said film; covering the tread strip and film by an envelope having a negative embossment of tread design in registry with a positive tread design on said tread strip; and curing said tread strip and bonding media at a temperature of at least substantially 300° F. The high temperature nylon film has a thickness in the order of 0.068–0.085-inches. A plurality of perforations are spread across the surface of said film. These perforations are in the order 1/16–1/8-inch in diameter and are separated from each other by a distance in the order of approximately ¾ to 1¼-inches.

4 Claims, 1 Drawing Sheet

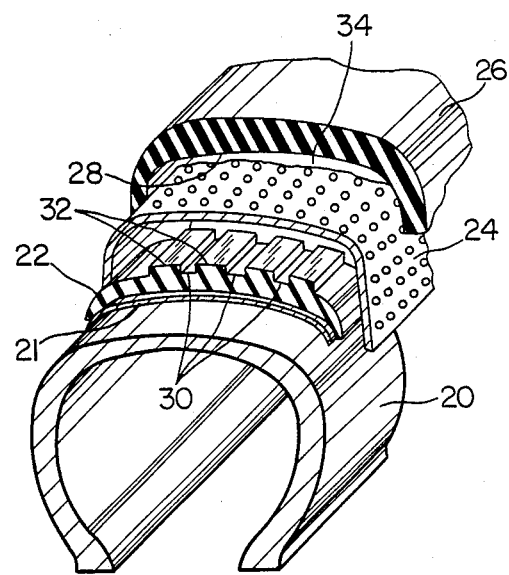

PROCESS FOR RETREADING OR RECAPPING TIRES

This invention relates to means and processes for retreading or recapping tires and more particularly to means for releasing the recapped tire from the envelope or mold.

Retreading or recapping tires involves dressing off an old tread on a used tire casing. Then, a new tread strip is attached around the circumference of the used tire casing with a self-vulcanizing bonding medium interposed therebetween. The casing and the new tread strip are placed inside an envelope or mold which is somewhat similar to a large rubber band that holds the tread strip in place. Initially, the inside of the envelope or mold is smooth; however, the heat and pressure during manufacture results in an embossed design being formed inside the envelope. Thus, the formed design is complementary to the design of the tread. If the complementary design does not have an almost perfect fidelity to the tread design, there will be an imperfect "cure" and the recapped tire may fail when it is put under stress.

After the tread strip is secured in place by the envelope, the tire casing, bonding medium, tread strip, and envelope are heated in a chamber to bond the tread strip to the casing. The heat is applied over an extended period of time while the tread strip and bonding medium are being cured. Several U.S. patents showing such a retreading process are: U.S. Pat. Nos. 4,075,047; 4,046,947; 3,841,376; and 3,779,833, of which 4,075,047 is perhaps the most pertinent.

There must be some kind of a release surface between the tread strip and the inside surface of the envelope or mold. Often, the release surface is provided by a thin plastic film which is placed over the tread strip before the envelope is snapped over it. The film does not melt or stick to the envelope at the curing temperature of the bonding material and the tread strip. However, such a film must also conform faithfully to the tread design or the bonding and final design will be defective in some respect. Therefore, it is necessary for the release film to have a characteristic by which it faithfully follows each and every contour in the tread. Also, the film should contain air holes to relieve entrapped air and to let it escape from the grooves in the tread design.

Heretofore, an exemplary tire recapping and retreading process required the release film to be slashed diagonally every ten to twelve inches, for example. As a result, the release film was ripped and torn as it was removed from the tread and envelope. Therefore, the release film could be used for only one cure. This prior system requires a continuous supply of a completely new release film, one for each and every cure. That requirement is expensive, time consuming, and requires the storage of a substantial number of release films.

The release film should be peeled off both the envelope and the tread without having it stick to either the tread strip or the bonding material. Without the release film, it is very likely that there would be such sticking with a result that the envelope would rip and have only the most limited life.

Still another consideration is the time required to recap a tire. For example, if the tread strip and bonding medium is cured at 212° F., a four hour curing time is required. If the curing temperature is raised to 300° F., the curing time is reduced to an hour and a half. Therefore, the production increases dramatically if the curing temperature is increased by even a small amount.

Accordingly, an object of this invention is to provide new and improved means for and processes of recapping tires. Here, an object is to provide new and improved release surfaces for lining the interior of an envelope and covering the tread strip.

Another object of the invention is to reduce the cost of recapping tires by providing reusable high temperature release surface film for lining the mold and by reducing the curing time.

In keeping with an aspect of this invention, these and other objects are accomplished by providing a high temperature nylon film which is pricked or perforated to form a grid pattern of air holes for releasing air which might otherwise be entrapped in the cavities of a tread design in both the tread strip and the envelope. The film may be easily removed from the envelope for repeated use. Since the high temperature nylon film more faithfully follows and conforms to the contours of the tread design, the recapped tire gives superior performance as compared to tires made through a use of prior art release film.

The attached drawing shows a preferred embodiment of the invention by means of an exploded cross section of a used tire casing with a tread strip being mounted thereon.

In greater detail, the drawing shows an automobile tire casing 20, a self-vulcanizing bonding medium 21, a retread strip 22, a release film, envelope liner 24, and an envelope or mold 26 for holding the tread strip in place during the curing. The envelope 26 is somewhat like a rather large rubber band which is snapped on over the tread strip to hold it in place during the curing cycle. The envelope 26 is shown in its initial smooth state before the cure. After the cure, the inside surface 28 of the envelope will have a negative image of the tread design which results from the curing temperature and pressure. The envelope does not retain the design too long and, therefore, is once again substantially smooth by the time that it is used again.

Then the entire unit is placed in a chamber which is raised to a curing temperature of about 300° F., at which the bonding material self-vulcanizes and the tread strip is cured. After the heat cycle, the tread strip is bonded to casing 20.

Since the curing normally occurs at 300° F., the tread strip becomes so hot that it might stick to the inside of the envelope if nothing is done to prevent it. Therefore, a unique liner 24 is positioned between the new tread strip and the interior of the envelope to enable the envelope to conform to the tread design to be able to deboss and reach the bottom of the grooves 30 of the tread pattern in the strip 22, with great fidelity of design.

The high temperature nylon release film 24 has a unique temperature range which enables the processing to go as high as 525° F., if necessary. This enables a use of a wide range of tread strip materials and bonding media. The film may be reused when curing occurs at approximately 300°-310° F. At 300°, the perforation, lubrication, flexibility, and non-stick properties of the high temperature nylon film enable the envelope to penetrate to the bottom of the tread grooves, to pass out all air, and to achieve uniform pressure on the tread pattern. The ultimate cure occurs within ninety minutes under either a steam or an electrical heating process.

The high temperature nylon release film 24 not only enables the envelope to conform to the tread design by penetrating to the bottom of the pattern grooves, but also protects each envelope from tearing or wearing out in a short period of time. The wear and tear would occur if the envelope had to be torn from the tire after each use. Another unique property of the high temperature nylon film is that it can be reused many times and still retain the good lubrication characteristics. Still another important aspect of the high temperature nylon film is that it retains its non-stick properties even after several module or chamber cures at 300° .F or more. The preferred film thickness is approximately 0.068–0.085 inches.

One source of the nylon film is DuPont of Canada, which offers the film under the trademark "Dartek 0-401." This manufacturer describes the film as an oriented nylon film, which is the condensation product of adipic acid and hexamethylene diamine. Many of the properties of this nylon are improved upon orientation, but particularly, the improvements relate to overall toughness and gas permeability. As a result, it has superior stiffness, toughness, gas permeability, temperature resistance and tear strength. In addition, its high yield characteristics make it an economically attractive film. The film provides excellent qualities which make it an ideal film for printing and laminating. The barrier properties and stiffness of the film make it an excellent choice for a variety of packaging end uses, such as snacks, processed meat, cheese, and condiments. The high strength, toughness and release properties of oriented nylon make it an ideal choice for tape base and plastics release application.

The manufacturer lists the physical properties, as follows:

| PROPERTY | DARTEK 0-401 | UNITS |
|---|---|---|
| Gauge | 15 | μm |
|  | 0.60 | mil |
| Specific Gravity | 1.14 | g/cc |
| Haze | 1.0 | % |
| Gloss | 150 | Photocell |
| (20% Gardner) |  | Microamps |
| Tensile Strength | MD 40,000 | 1 lb/in$^2$ |
|  | TD 9,000 |  |
|  | MD 2,800 | kg/cm$^2$ |
|  | TD 630 |  |
| Elongation | MD 50 | % |
|  | TD 250 |  |
| Tensile Modulus | MD 425,000 | lb/in$^2$ |
| (stiffness) | TD 375,000 | (50% RH) |
|  | MD 30,000 | kg/cm$^2$ |
|  | TD 26,000 | (50% RH) |
| Tear Strength | MD 100 | g/mil |
| (Elmendorf- | TD 100 |  |
| Propagated) | MD 4 | g/μm |
|  | TD 4 |  |
| Tear Strength | MD 1,000 | g/mil |
| (Graves-Initial) | TD 700 |  |
|  | MD 40 | g/μm |
|  | TD 28 |  |
| Impact Strength | 100 | g |
| Kinetic Coefficient | 0.5 |  |
| of Friction | 0.3 |  |
| Moisture Permeability | 9.5 | g/100 in$^2$/24 hr. |
|  | 145 | g/m$^2$/24 hr. |
| Oxygen Permeability | 2.5 (0% RH, 73° F.) | cm$^3$/100 in$^2$/24 hr. |
|  | 5.0 (100% RH, 73° F.) |  |
|  | 0.7 (39° F., 100% RH) |  |
|  | 39 (0% RH, 23° C.) | cm$^3$/m$^2$/24 hr. |
|  | 77 (100% RH, 23° C.) |  |
|  | 11 (100% RH, 4° C.) |  |

The high temperature nylon film 24 is also manufactured and sold by the Reynolds Aluminum Company, having a business address at Richmond, Va. 23261. The Reynolds Aluminum Company identifies the nylon film as XP-34 film.

The film received from the manufacturer is run through a perforating machine which places a number of pin pricks or air holes in the film, in substantially a grid pattern. Machines for perforating such film are shown in U.S. Pat. Nos. 2,068,456; 2,748,863; 3,038,198; 3,054,148; 3,348,022; 3,355,974. The holes or perforations do not have to be of any particular size as long as they allow an escape of any air which may be entrapped in the tread grooves 30 and under the envelope 26. The perforations of the film may vary in diameter from approximately 1/16 to approximately ⅛ of an inch. The rows of perforations may be formed in the range of approximately ¾–1¼-inches apart, and preferably, approximately one-inch apart, for example. The perforations should be fairly evenly spaced over the entire surface of the high temperature nylon film.

The more difficult tread designs for the film 24 to accommodate are the ones with very deep and narrow grooves. The most difficult tread design is known in the trade as highway 16, with which the inventive film has been found to work well and without any serious problems.

The prior art film could not be used at temperatures above 212° F., which required 240-minutes to cure. Thus, the invention has reduced processing time to less than a third of the prior art processing time. Or stated another way, over three times the amount of production machinery would be required to have the same production level if the prior art process is used. At the 300° F. curing temperature, the inventive production process enables each envelope to be used to recap approximately twenty-five tires as compared to about eight tires with the prior art production process.

The foregoing example of advantages over the prior art makes the comparisons of the production processes which are thought to be most pertinent. If the comparisons were to be extended to all processes now in use the advantages would include a savings of wicking material, reduction of time for unloading curing chambers, increase of the ability to exhaust ambient air and reducing the need to paint the interior of the envelope with a release material. In addition, it is easier to manufacture better recapped tires with less need for pressure adjustments.

Those who are skilled in the art will readily perceive how to modify the invention. Therefore, the appended claims are to be construed to cover all equivalent structures which fall within the true scope and spirit of the invention.

What is claimed is:

1. A process for recapping tires comprising the steps of:
   (a) placing a tread strip around the circumference of a used tire casing with a bonding media interposed between the strip and casing;
   (b) directly covering the treadstrip with a high temperature nylon release film having a plurality of perforations substantially uniformly distributed across the surface of said film;
   (c) covering the tread strip and film by an envelope which develops a negative embossment of tread design in registry with a positive tread design on said tread strip during the processing cycle; and (d) curing said tread strip and bonding media with said film in place at a temperature of at least substantially 300° F.

2. The process of claim 1 wherein said perforations have a diameter in the order of approximately 1/16-1/8 inch and a separation between each other in the order of approximately 1-inch.

3. The process of claim 1 wherein the curing of step (d) is continued for a period of approximately 90-minutes.

4. The process of claim 1 wherein the film has a thickness in the order of 0.068–0.085-inches.

* * * * *